Patented May 16, 1933

1,909,738

UNITED STATES PATENT OFFICE

HUGO WOLFF, OF MANNHEIM, GERMANY, ASSIGNOR TO GENERAL ANILINE WORKS, INC., OF NEW YORK, N. Y., A CORPORATION OF DELAWARE

PRODUCTION OF BENZANTHRONE DERIVATIVES

No Drawing. Application filed October 31, 1927, Serial No. 230,191, and in Germany November 5, 1926.

I have found that valuable intermediate products for the manufacture of vat dyestuffs, namely Bz-1-methoxybenzanthrone and its derivatives of the general formula:

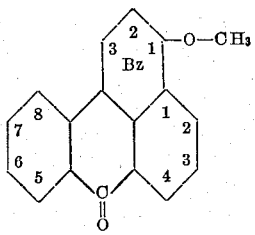

(in which the benzanthronyl radicle may contain further substituents) are obtained by treating benzanthrones, which contain a negative substituent such as the nitro group, halogen, a sulfonic acid or sulfone group and the like, in the Bz-1-position, with methyl alcohol in the presence of alkaline agents such for example as caustic alkalis or alkali carbonates. The reaction proceeds without difficulty and is usually carried out at temperatures of about from 50° to 150° C., but temperatures outside this range may also be employed. When Bz-1-nitrobenzanthrones are employed as the initial material, nitrites are formed in the reaction, which by reason of their oxidizing properties, may give rise to the formation of by-products, so that it is in some cases advisable to add to the reaction mixture substances such as sodium sulfite, urea and the like which destroy the nitrites.

The following examples further illustrate the nature of the said invention which however is not limited thereto. The parts are by weight.

Example 1

10 parts of Bz-1-nitrobenzanthrone with a melting point of from 244° to 245° C. in a state of fine division are heated to boiling with 10 parts of powdered caustic soda and 200 parts of methyl alcohol, under a reflux condenser, until the conversion is completed. The liquid is then treated with water, the olive-green precipitate being filtered off, washed and dried. The resulting crude methoxybenzanthrone can be readily purified by boiling with solvents of low boiling point, such as acetone or ethyl alcohol, in which it dissolves to a yellow solution with moss-green fluorescence. It crystallizes in yellow needles which melt at a temperature of 173° C. and dissolve, in concentrated sulfuric acid, to an intense red-violet solution with carmine-red fluorescence. If nitric acid be added to the said solution, the color changes to red, with yellow fluorescence. The caustic soda may be replaced, with equal effect, by caustic potash.

Example 2

20 parts of Bz-1-nitrobenzanthrone, in a state of fine division, are heated with 30 parts of calcined soda, 6 parts of urea and 500 parts of methyl alcohol, at a temperature of 135° C. in an autoclave fitted with a stirrer, for about 15 hours. The subsequent treatment is the same as in Example 1. The Bz-1-methoxybenzanthrone is obtained, in a nearly pure state, as a brownish-yellow crystalline powder, melting at a temperature of from 169° to 170° C. By a single recrystallization from acetone, the melting point is raised to a temperature of 173° C. and the product is identical with the methoxybenzanthrone described in Example 1.

Example 3

10 parts of Bz-1-nitro-6-chlorbenzanthrone with a melting point of 277° C. are boiled, with 10 parts of caustic soda and 300 parts of methyl alcohol, under a reflux condenser until none of the original substance is left unaltered. After the liquid has been treated with hot water, a dark olive powder is obtained, which dissolves to a red-violet solution in concentrated sulfuric acid. On recrystallization from pyridine and then from nitrobenzene, beautiful red-brown needles with a melting point of 258° C. are obtained. As results from their origin and their analysis, they consist of 6-chlor-Bz-1-methoxybenzanthrone. The substance dissolves readily in organic solvents to a yellow solution with moss-green fluorescence, and to a red-violet solution with intense carmine-red fluorescence in concentrated sulfuric acid.

If nitric acid is added to the sulfuric acid solution, the color changes to red and no fluorescence can be observed.

Example 4

20 parts of 6-Bz-1-dinitro-benzanthrone with a melting point of 266° C. in paste form are heated to boiling with 20 parts of caustic soda and 600 parts of methyl alcohol, for about 40 hours under a reflux condenser. The brown crude product obtained by treatment of the reaction product in the usual manner, dissolves to a violet-red solution in concentrated sulfuric acid, and can be purified by boiling with glacial acetic acid. The resulting 6-nitro-Bz-1-methoxybenzanthrone is obtained in a perfectly pure state by recrystallization from nitrobenzene. After being repeatedly re-dissolved, it finally crystallizes in beautiful red-brown needles, melting at a temperature of 318° C. and giving, on analysis, data corresponding to nitromethoxybenzanthrone. The substance dissolves in concentrated sulfuric acid to a red solution, with a bluish tinge and devoid of fluorescence, the color changing to reddish-yellow on addition of a few drops of nitric acid and exhibiting a brownish-yellow fluorescence. In organic solvents of low boiling point it dissolves with some difficulty to a yellow solution showing no fluorescence.

Example 5

20 parts of Bz-1-nitro-6-methylbenzanthrone with a melting point of 280° C. are heated with 30 parts of finely divided potassium carbonate, 6 parts of urea and 500 parts of methyl alcohol, at a temperature of 120° C. for 15 hours in an autoclave fitted with a stirrer. The resulting brown product melts at a temperature of from 210 to 220° C. and dissolves to a violet solution in concentrated sulfuric acid. It dissolves readily in acetone, to a yellow solution with moss-green fluorescence and crystallizes therefrom as lustrous yellow needles, which melt at a temperature of 218° C., and dissolve in concentrated sulfuric acid to a blue-violet solution with violet-red flluorescence. According to the results of analysis, the product is 6-methyl-Bz-1-methoxybenzanthrone.

Example 6

15 parts of Bz-1-nitro-8-chlorbenzanthrone with a melting point of 221° C. are heated to boiling with 15 parts of powdered caustic soda and 500 parts of methyl alcohol, under a reflux condenser for several hours. The conversion proceeds in a very equable manner, and the resulting light brown crude product with a melting point of 218° to 220° C. dissolves in concentrated sulfuric acid to a blue-violet solution. On crystallization from glacial acetic acid or monochlorbenzene, it is obtained as small lustrous yellow crystals, which melt at a temperature of from 225° to 226° C. and consist of 8-chlor-Bz-1-methoxybenzanthrone as results from its formation and analysis. The said crystals are readily soluble in organic solvents to yellow solutions with moss-green fluorescence and give a blue-violet solution with strong carmine-red fluorescence with concentrated sulfuric acid.

Example 7

10 parts of Bz-1-chlorbenzanthrone with a melting point of from 176° to 178° C. in the finest possible state of division, are heated in an autoclave, fitted with a stirrer, at 120° C. for about 20 hours, along with 10 parts of powdered caustic soda and 400 parts of methyl alcohol. The cooled melt is boiled up with water, and the Bz-1-methoxybenzanthrone, which separates out in small brownish-yellow needles melting at from 172° to 173° C. is filtered off by suction and washed. It is identical with the product described in Example 1. In place of Bz-1-chlorbenzanthrone, Bz-1-brombenzanthrone may also be used with the same result.

Example 8

5 parts of the sodium salt of Bz-1-benzanthrone-sulfonic acid are heated with 5 parts of powdered caustic soda and 500 parts of methyl alcohol, at 135° C. for about 20 hours in an autoclave fitted with a stirrer. The cooled melt is boiled up with water, and the yellow-brown powder is filtered by suction, washed and dried. A single recrystallization from acetone furnishes pure Bz-1-methoxybenzanthrone, melting at 173° C.

Example 9

5 parts of Bz-1.Bz-1'-dibenzanthronylsulfone with a melting point of 350° are heated for about 18 to 20 hours, at 135° C., in an autoclave fitted with a stirrer, along with 10 parts of caustic soda and 700 parts of methyl alcohol. After the usual treatment with hot water the Bz-1-methoxybenzanthrone deposited as brownish-yellow flakes, is filtered off by suction, washed and dried. It melts at from 166° to 168° C. and is obtained in a perfectly pure state after a single recrystallization from acetone.

Example 10

10 parts of 6.Bz-1-dibrombenzanthrone with a melting point of 253° C. are heated with 15 parts of potassium carbonate and 600 parts of methyl alcohol in an autoclave fitted with a stirrer, for about 20 hours at 135° C. After the usual treatment with hot water, the crude product with a melting point of from 260 to 265° C. separating out as small yellow-brown crystals, is recrystallized from nitrobenzene and then from pyridine, from which solvents it is obtained in the form of long handsome needles melting at 275° C. The 6-brom-Bz-1-methoxybenzanthrone dissolves to a red-violet solution in concentrated sulfuric acid and exhibits an intense carmine-red fluorescence. On addition of a few drops of concentrated nitric acid, the color turns to red, and the fluorescence disappears.

6-brom-Bz-1-methoxybenzanthrone is also obtained according to the same manner of working if the 6.Bz-1-dibrombenzanthrone is replaced by 6-brom-Bz-1-chlorbenzanthrone with a melting point of 252° C.

*Example 11*

20 parts of 6-chlor-Bz-1-brombenzanthrone with a melting point of 258° C. in a finely divided state, are heated with 20 parts of caustic soda and 1000 parts of methyl alcohol, at 120° C. for about 20 hours in an autoclave fitted with a stirrer. The resulting greenish-yellow crystalline crude product can be purified by recrystallization from nitrobenzene and then from pyridine. After being repeatedly redissolved, the 6-chlor-Bz-1-methoxybenzanthrone is finally obtained in the form of handsome yellow needles with a melting point of from 262 to 263° C. The product is identical with that obtained according to Example 3.

*Example 12*

10 parts of 6.Bz-1-dichlorbenzanthrone with a melting point of 262° C. are heated with 15 parts of potassium carbonate and 600 parts of methyl alcohol at 130° C. for 20 hours in an autoclave fitted with a stirrer. On repeated recrystallization from pyridine of the crude product obtained as brownish-yellow needles, the 6-chlor-Bz-1-methoxybenzanthrone can be obtained, in a perfectly pure state, as handsome yellow needles with a melting point of 265° C. The product is identical with that of the preceding example.

*Example 13*

10 parts of Bz-1-chlor-6-nitrobenzanthrone with a melting point of from 280 to 281° C. are heated with 10 parts of potassium carbonate and 500 parts of methyl alcohol, in an autoclave, fitted with a stirrer, for 10 hours at 110° C. The liquid is boiled up with water, whereupon the separated crude product, in the form of small yellow crystals melting at from 300 to 305° C. is filtered off by suction. By a twofold recrystallization from nitro-benzene, the 6-nitro-Bz-1-methoxybenzanthrone is obtained in the pure state as yellow needles melting at 315° C., and dissolving in concentrated sulfuric acid to a bluish-red solution devoid of fluorescence. The product is identical with that described in Example 4.

*Example 14*

20 parts of 8-Bz-1-dichlorbenzanthrone with a melting point of from 221° to 222° C. in the finest possible state of division, are heated with 25 parts of potassium carbonate and 600 parts of methyl alcohol, for 20 hours at 120° C., in an autoclave, fitted with a stirrer. After dilution with hot water, the liquid is filtered off by suction, and the resulting yellow crystalline crude product is recrystallized from nitrobenzene. In this way, small, lustrous yellow crystals are obtained melting at from 222 to 223° C., and dissolving in concentrated sulfuric acid to an intense blue-violet solution with a strong brown-red fluorescence. According to its formation and analytical data, the product is 8-chlor-Bz-1-methoxybenzanthrone, and is identical with the product described in Example 6.

*Example 15*

10 parts of Bz-1-chlor-6-methylbenzanthrone with a melting point of from 208° to 210° C. are heated with 15 parts of potassium carbonate and 500 parts of methyl alcohol for 20 hours at 120° C. in an autoclave fitted with a stirrer. The resulting 6-methyl-Bz-1-methoxybenzanthrone formed with a very good yield can be obtained in a pure state, as lustrous brown-yellow crystals with a melting point of 218° C. by a single recrystallization from acetone. It is identical with the product described in Example 5.

What I claim is:—

1. The process for the production of Bz-1-methoxybenzanthrones which comprises heating to reaction temperature benzanthrones containing a negative substituent in the Bz-1-position with methyl alcohol in the presence of an alkali metal compound yielding hydroxyl ions.

2. In the process of claim 1 the employment of Bz-1-nitrobenzanthrones as the initial materials.

3. In the process of claim 1 the employment of Bz-1-nitrobenzanthrones as initial materials and the addition of a substance selected from the group consisting of urea and sodium sulfite, whereby the nitrite formed is destroyed.

4. The process of producing Bz-1-methoxybenzanthrone containing a substituent in the 6-position, which comprises causing a benzanthrone containing a negative substituent in the Bz-1 position and the desired substituent in the 6-position to react with methyl alcohol in the presence of an alkaline metal compound yielding hydroxyl ions at temperatures of from 50 to 150° C.

5. The process of producing Bz-1-methoxy-6-halogenbenzanthrone, which comprises boiling 6 halogen-Bz-1-nitro-benzanthrone with caustic soda and methyl alcohol.

6. Bz-1-methoxybenzanthrones.

7. Bz-1-methoxybenzanthrones containing a negative substituent in the 6-position.

8. Bz-1-methoxy-6-halogenbenzanthrone.

In testimony whereof I have hereunto set my hand.

HUGO WOLFF.